3,035,931
THERMOPLASTIC COMPOSITIONS AND A METHOD OF MAKING THE SAME
Clarence Bobbe and Robert J. Kufrin, Chicago, Ill., assignors, by mesne assignments, to Witco Chemical Company, Inc., New York, N.Y., a corporation of Delaware
No Drawing. Filed July 23, 1958, Ser. No. 750,294
9 Claims. (Cl. 106—235)

Our invention relates to improvements in thermoplastic compositions particularly useful in the making of sealing and/or insulating materials, such as transformer potting and hot melt sewer joining materials. Thermoplastic materials of this type are commonly manufactured by initially melting a thermoplastic binder and dispersing therein various solid and liquid ingredients which impart the desired characteristics to the mix. The hot melted liquid mix is then either poured directly into strippable metal containers where it cools into a solid mass, or fed to molds where upon cooling and hardening of the material, it is formed into solid bricks which are placed in fiberboard cartons. These packaged solid materials are then shipped to the ultimate users thereof, where the metal containers or fiberboard cartons are stripped from their solid contents which are then melted down and conveyed in liquid form, in the proper amounts, to molds or the like where they are to be used.

We have developed new thermoplastic sealing and insulating compositions having numerous advantages over these prior solid thermoplastic sealing and insulating materials, some of which advantages relate to the unique form in which they are manufactured, resulting in greater efficiency and ease in handling, storing and packaging the same. Our thermoplastic heating and sealing materials comprise a thermoplastic organic binder in a substantially dry, granulated form and in which is evenly dispersed a finely divided filler and a suitable liquid plasticizer. This composition may be simply and economically manufactured by pulverizing or otherwise breaking relatively large pieces of solid organic binder into relatively small particles, for example, no greater than ½ inch, and then evenly mixing through the organic binder the particles of finely divided filler and relatively small amounts of liquid plasticizer which does not substantially wet the binder and filler particles. The resultant composition is a substantially dry mix having free flowing characteristics in the cold state, and so can be simply handled and shipped in bulk to the large users in hopper cars or trucks and stored in bins or silos similar to bulk the shipment and storage of sand, gravel, coal, grain, etc. The free flowing characteristic of our dry mix has the further advantage that, when stored in bulk form in a bin, hopper or the like, it can be easily conveyed from the bin or hopper to a desired location in any amounts desired by use of automatic conveyor belts and the like. Then, it can be simply converted into usable form for molding and the like by simply melting the thermoplastic binder to form a liquid mix.

In the case of the smaller user, our substantially dry mix can be easily packaged in paper bags which can be stacked and palletized more effectively than the conventional fiberboard cartons or strippable metal containers. Moreover, the free flowing dry material can be readily poured from the paper bags, eliminating the troublesome container-stripping operation necessary in the removal of the above-mentioned solid materials from the strippable metal containers and fiberboard cartons. Also, with the use of paper bags, the problem of disposal of sharp pieces of metal or shredded carton material is obviated.

The thermoplastic binder most advantageously is made of petroleum refined asphaltic residuals or naturally occurring asphalts, such as grahamite, gilsonite, asphalt, etc., or natural petroleum refined or synthetic waxes, resins and pitches. In the case of petroleum refined asphaltic residuals, these materials can be treated to provide the required hardness suitable for granulation or pulverizing by air-blowing or other means. Most preferably, the natural and petroleum refined asphalt materials should have a softening point in the range from 180 to 320 degrees Fahrenheit and a hardness, measured by needle penetrometer at 77 degrees Fahrenheit (ASTM E28–51T), of from 0 to 25 dmm. penetration. In the case of the natural, petroleum refined and synthetic waxes, resins and pitches, the softening points thereof should preferably fall in a range of from 130 to 300 degrees Fahrenheit and they should most desirably have a hardness, measured by needle penetrometer at 77 degrees Fahrenheit, of from 0 to 50 dmm. penetration.

The fillers are preferably inert, inorganic materials effective for decreasing temperature susceptibility, increasing thermo-conductivity and dimensional stability and imparting toughness to the binder. Examples of fillers which may be used are ground silica, both amorphous and crystalline, diatomaceous silica, slate dust, clay, talc, and the oxides of aluminum and iron.

The plasticizer may include flux oil, liquid elastomers or polymers that posses sufficient compatibility and plasticizing effect on the solid binder to impart the necessary physical properties, such as, flexibility, elasticity, ductility, adhesion, good cohesive characteristics, etc. Examples of such materials are paraffinic and naphthenic mineral oils, petrolatums, aromatic plasticizing oils, drying and semi-drying oils, rosin oils, and liquid and semi-liquid polymers such as polybutenes, polyesters, polyethers, phenolics, and silicone oils and resins.

The thermoplastic organic binder is ground or pulverized into granules or particles preferably no larger than ½ inch in maximum dimensions, and advantageously so that from 50 to 80% or more of the same pass through a 10 mesh screen. Where a wax or resinous material is utilized which is not suited for pulverizing, the material may be flaked or otherwise processed into flakes or particles of the size above mentioned. The resultant binder in particulate form may then be placed in a suitable tumbling or mixing device capable of mixing dry powders and liquids together. The above mentioned filler materials are provided in a finely divided form, for example, from 20% through 100 mesh to as fine as 95% through 400 mesh. The liquid plasticizer is sprayed or dripped into the mixing apparatus either cold or warmed if need be into the tumbling dry ingredients and the mixing is continued until a homogeneous mixture of the binder and filler particles and the liquid plasticizer is obtained.

The proportions of the various binder, filler and plasticizer ingredients are preferably kept within certain prescribed ranges. Thus, the organic thermoplastic binder preferably constitutes from 30 to about 70%, most preferably from 45 to about 60%, by weight, of the resultant mixture. The filler preferably comprises from 69 to about 30%, most preferably 54 to about 39%, by weight, of the mixture, with the remainder, from 1 to about 5%, comprising the liquid plasticizer. This liquid plasticizer thus constitutes a relatively small percentage of the resultant mixture and does not, therefore, adversely affect the free-flowing and substantially dry characteristics of the dry binder and filler mix.

The following examples are illustrative of typical compositions particularly useful as transformer potting compositions and the like falling within the scope of my invention. It will be understood that others may readily be prepared in the light of the guiding principles and disclosures provided herein. All percentages listed are by weight.

Example 1

| | Percent |
|---|---|
| Petroleum refined air blown asphalt (softening point 275–285 degrees F., hardness 5–10 dmm. needle penetrometer at 77 degrees F.) | 40 |
| Ground silica flour (90% through 325 mesh) | 55 |
| Mineral oil plasticizer | 5 |

Example 2

| | |
|---|---|
| Petroleum refined air blown asphalt (softening point 260–265 degrees F., hardness 5–8 dmm. needle penetrometer at 77 degrees F.) | 45 |
| Slate dust | 50 |
| Rosin oil | 5 |

Example 3

| | |
|---|---|
| Asphalt (softening point 220–230 degrees F., hardness 5–10 dmm. needle penetrometer at 77 degrees F.) | 48 |
| Diatomaceous silica | 48 |
| Mineral oil | 4 |

It should be understood that various modifications may be made in the several materials and compositions above described without deviating from the teachings of the present invention.

We claim:

1. A transformer potting composition consisting essentially of a homogeneous, free-flowing, substantially dry mixture of 30 to 70% of organic thermoplastic binder in particulate form no larger than ½ inch, at least 50% of which passes through a 10 mesh screen, said thermoplastic binder being at least one material selected from the group consisting of natural occurring asphalts and petroleum refined asphaltic residuals, from 69 to 30% of inorganic filler in particulate form, and from 1 to 5% of liquid organic plasticizer, said percentages being by weight of said composition.

2. A thermoplastic sealing or insulating composition consisting essentially of a homogeneous, free-flowing, substantially dry mixture of 45 to 60% of at least one thermoplastic binder in particulate form selected from the group consisting of natural occurring asphalts and petroleum refined asphaltic residuals, 54 to 39% of inorganic filler in particulate form, and 1 to 5% of liquid plasticizer, said percentages being by weight of said composition.

3. A thermoplastic sealing or insulating composition consisting essentially of a homogeneous, free-flowing, substantially dry mixture of 30 to 70% of at least one thermoplastic binder in particulate form selected from the group consisting of natural occurring asphalts and petroleum refined asphaltic residuals, 69 to 30% of finely divided inorganic filler, and 1 to 5% of liquid plasticizer, said percentages being by weight of said composition.

4. A transformer potting composition consisting essentially of a homogeneous, free-flowing, substantially dry mixture of 30 to 70% by weight of at least one organic thermoplastic binder in particulate form no larger than ½ inch, at least 50% of which passes through a 10 mesh screen, selected from the group consisting of naturally occurring asphalts and petroleum refined asphaltic residuals, 69 to 30% by weight of finely divided inorganic filler; and the remainder from about 1 to 5% liquid organic plasticizer.

5. A transformer potting composition in accordance with claim 4, wherein the naturally occurring asphalts and petroleum refined asphaltic residuals have a softening point in the range of from 180 to 320 degrees F. and a hardness as measured by needle penetrometer at 77 degrees F. (ASTM E28–51T) of from 0 to 25 dmm.

6. A sealing or insulating composition in accordance with claim 2, wherein the thermoplastic binder comprises naturally occurring asphalts having a hardness as measured by needle penetrometer at 77 degrees F. (ASTM E28–51T) of from 0 to 25 dmm.

7. A sealing or insulating composition in accordance with claim 2, wherein the thermoplastic binder has a softening point in the range of from 180 to 320 degrees F.

8. A sealing or insulating composition in accordance with claim 2, wherein said thermoplastic binder comprises petroleum refined asphaltic residuals having a hardness as measured by needle penetrometer at 77 degrees F. (ASTM E28–51T) of from 0 to 25 dmm.

9. A sealing or insulating composition in accordance with claim 3, wherein the plasticizer is at least one normally liquid oily material selected from the group consisting of paraffinic mineral oils, petrolatums, aromatic oils, drying and semi-drying oils, and rosin oils.

References Cited in the file of this patent

UNITED STATES PATENTS

| | | |
|---|---|---|
| 1,685,304 | West | Sept. 25, 1928 |
| 1,982,689 | Polydoroff | Dec. 4, 1934 |
| 1,991,115 | Northrup et al. | Feb. 12, 1935 |
| 2,045,906 | Gardner | June 30, 1936 |
| 2,326,812 | Wiggam et al. | Aug. 17, 1943 |
| 2,389,940 | Speicher | Nov. 27, 1945 |
| 2,393,774 | Hoiberg | Jan. 29, 1946 |
| 2,430,987 | Lindner | Nov. 18, 1947 |
| 2,554,461 | Howes et al. | May 22, 1951 |
| 2,558,047 | Gloor | June 26, 1951 |
| 2,635,054 | Doyle | Apr. 14, 1953 |